US008739910B2

United States Patent
Katayama et al.

(10) Patent No.: US 8,739,910 B2
(45) Date of Patent: Jun. 3, 2014

(54) POWER SUPPLY SYSTEM FOR ELECTRIC VEHICLE

(71) Applicant: Honda Motor Co., Ltd., Tokyo (JP)

(72) Inventors: Goichi Katayama, Wako (JP); Yasuaki Hotozuka, Wako (JP); Kosuke Tachikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 85 days.

(21) Appl. No.: 13/657,862

(22) Filed: Oct. 23, 2012

(65) Prior Publication Data

US 2013/0119706 A1 May 16, 2013

(30) Foreign Application Priority Data

Nov. 14, 2011 (JP) ................................. 2011-248430

(51) Int. Cl.
*B60R 16/04* (2006.01)
*B62D 21/00* (2006.01)
*B60J 7/00* (2006.01)

(52) U.S. Cl.
USPC ..................... 180/68.5; 180/311; 296/187.03; 296/187.09

(58) Field of Classification Search
USPC ................... 296/187.09, 187.03, 187.1, 204; 180/68.5, 65.1, 58, 60, 291, 232, 311, 180/312; 903/903, 904, 907, 951, 952
See application file for complete search history.

(56) References Cited

U.S. PATENT DOCUMENTS

| | | | | |
|---|---|---|---|---|
| 5,555,950 A | * | 9/1996 | Harada et al. | 180/68.5 |
| 6,220,380 B1 | * | 4/2001 | Mita et al. | 180/65.1 |
| 7,568,755 B2 | * | 8/2009 | Imada et al. | 296/187.11 |
| 7,614,473 B2 | * | 11/2009 | Ono et al. | 180/299 |
| 7,905,541 B2 | * | 3/2011 | Yamaguchi et al. | 296/203.04 |
| 7,926,602 B2 | * | 4/2011 | Takasaki | 180/68.5 |
| 8,205,700 B2 | * | 6/2012 | Nagata et al. | 180/68.5 |
| 8,210,301 B2 | * | 7/2012 | Hashimoto et al. | 180/68.5 |
| 8,453,778 B2 | * | 6/2013 | Bannier et al. | 180/68.5 |
| 8,505,662 B2 | * | 8/2013 | Schwarz et al. | 180/68.5 |
| 8,540,282 B2 | * | 9/2013 | Yoda et al. | 180/68.5 |
| 8,567,543 B2 | * | 10/2013 | Kubota et al. | 180/68.5 |
| 8,657,365 B2 | * | 2/2014 | Amano et al. | 296/187.11 |
| 2009/0178867 A1 | | 7/2009 | Nagata et al. | |

FOREIGN PATENT DOCUMENTS

WO    WO 2007/129759    11/2007

* cited by examiner

*Primary Examiner* — J. Allen Shriver, II
*Assistant Examiner* — James M Dolak
(74) *Attorney, Agent, or Firm* — Ditthavong Mori & Steiner, P.C.

(57) ABSTRACT

A power supply system for an electric vehicle includes a battery, a first power line, a first connector, a first shock absorbing member, a first rigid member, and a second rigid member. The first rigid member includes a first front connection portion and a rear portion. The second rigid member includes a first rear connection portion and a front portion. The rear portion of the first rigid member is contactable with the front portion of the second rigid member at a contact point when a front-end collision of the electric vehicle occurs. The first connector is disposed within a first triangular region defined by the first front connection portion, the first rear connection portion, and the contact point in a plan view of the electric vehicle.

10 Claims, 6 Drawing Sheets

POWER SUPPLY SYSTEM FOR ELECTRIC VEHICLE

CROSS-REFERENCE TO RELATED APPLICATIONS

The present application claims priority under 35 U.S.C. §119 to Japanese Patent Application No. 2011-248430, filed Nov. 14, 2011, entitled "Power Supply System for Electric Vehicle." The contents of this application are incorporated herein by reference in their entirety.

BACKGROUND OF THE INVENTION

1. Field of the Invention

The present application relates to a power supply system for an electric vehicle.

2. Discussion of the Background

A battery pack that supplies power to a motor generator serving as a drive source for running an electric vehicle has a voltage as high as several hundred volts. The power is supplied from the battery pack through a connector to a power drive unit of the motor generator. Since the connector is exposed to facilitate insertion and removal operation, the connector may be damaged by impact in the event of a collision of the vehicle. If the connector is damaged, the high voltage of the battery pack may cause a ground fault in a vehicle body frame, which may result in electric shock.

International Publication No. WO 2007/129759 A1 discloses a technique in which an electric storage device of a vehicle is disposed between left and right rear wheels, a high-voltage connector is disposed to be oriented toward the inside (or front) of the vehicle body, and a low-voltage connector is disposed to be oriented toward the outside (or rear) of the vehicle body, so as to protect the high-voltage connector in the event of a collision of the vehicle and prevent occurrence of a ground fault.

SUMMARY OF THE INVENTION

According to one aspect of the present invention, a power supply system for an electric vehicle includes a battery, a first power line, a first connector, a first shock absorbing member, a first rigid member, and a second rigid member. The battery is mounted on a vehicle body of the electric vehicle. Power is to be supplied from the battery via the first power line. The first connector connects the first power line to the battery. The first shock absorbing member is provided in a vehicle body frame of the vehicle body and includes a structure to deform to absorb collision energy when a front-end collision of the electric vehicle occurs. The first rigid member is disposed on a front side of the first shock absorbing member and includes a first front connection portion and a rear portion. The first front connection portion is connected to the first shock absorbing member. The second rigid member is disposed on a rear side of the first shock absorbing member and includes a first rear connection portion and a front portion. The first rear connection portion is connected to the first shock absorbing member. The rear portion of the first rigid member is spaced apart from the front portion of the second rigid member in a front and rear direction of the electric vehicle. The rear portion of the first rigid member is contactable with the front portion of the second rigid member at a contact point when a front-end collision of the electric vehicle occurs. The first connector is disposed within a first triangular region defined by the first front connection portion, the first rear connection portion, and the contact point in a plan view of the electric vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

As illustrated in FIG. 1 to FIGS. 3A and 3B, a vehicle body frame of an electric vehicle includes a pair of left and right floor frames 11 and 11 extending in the front and rear direction of the vehicle body. A pair of left and right front side frames 12 and 12 extends frontward and upward from respective front ends of the left and right floor frames 11 and 11. A pair of left and right rear side frames 13 and 13 extends rearward and upward from respective rear ends of the left and right floor frames 11 and 11.

Front ends of the left and right front side frames 12 and 12 are connected to each other by a front bumper beam 14 extending in the vehicle width direction. Front ends of the left and right floor frames 11 and 11 are connected to each other by a front cross member 15 extending in the vehicle width direction. Middle portions of the left and right floor frames 11 and 11 in the front and rear direction of the vehicle body are connected to each other by a middle cross member 16 extending in the vehicle width direction. Middle portions of the left and right rear side frames 13 and 13 in the front and rear direction of the vehicle body are connected to each other by a rear cross member 17 extending in the vehicle width direction. Rear ends of the left and right rear side frames 13 and 13 are connected to each other by a rear bumper beam 18 extending in the vehicle width direction.

A pair of left and right side sills 19 and 19 is disposed outside the left and right floor frames 11 and 11 in the vehicle width direction and extends in the front and rear direction of the vehicle body. Front ends of the left and right side sills 19 and 19 and rear ends of the left and right front side frames 12 and 12 are connected to each other by a pair of left and right front outriggers 20 and 20 extending in the vehicle width direction. Rear ends of the left and right side sills 19 and 19 are connected to respective front ends of the left and right rear side frames 13 and 13.

A plate-like front subframe 21 (a first rigid member) is secured at the front thereof, with one bolt 22 each on the left and right sides, to lower surfaces of middle portions of the front side frames 12 and 12 in the front and rear direction of the vehicle body. The front subframe 21 is also secured at the rear thereof, with two bolts 23 and 23 each on the left and right sides, to lower surfaces of rear portions of the front side frames 12 and 12. Front portions of the left and right front side frames 12 and 12 are connected to each other by a front mount beam 24 extending in the vehicle width direction. A motor generator 25 serving as a drive source for running the electric vehicle is provided with a rear mount bracket 26 at the rear thereof supported by a rear mount 27 on an upper surface of the front subframe 21. The motor generator 25 is also provided with a pair of left and right front mount brackets 28 and 28 at the front thereof supported by a pair of left and right front mounts 29 and 29 on a lower surface of the front mount beam 24.

A battery pack 31 (a second rigid member) that contains a plurality of battery modules 30 (see FIG. 2) (a battery) serving as a power source for the motor generator 25 includes a metal battery tray 32 and a battery cover 34. The battery tray 32 holds the battery modules 30, and the battery cover 34 is attached to the battery tray 32 with a plurality of bolts 33 on an upper surface of the battery tray 32. The battery tray 32 has an internal hollow space through which cooling air passes to cool the battery modules 30.

Three suspended beams 35, 36, and 37 extending in the vehicle width direction are secured with bolts 38 to a lower surface of the battery pack 31. The suspended beam 35 on the foremost side is secured at both ends thereof, with bolts 39, to lower surfaces of the left and right floor frames 11 and 11. The suspended beam 36 in the middle is secured at both ends thereof to the lower surfaces of the left and right floor frames 11 and 11. The suspended beam 37 on the rearmost side is secured at both ends thereof, through a pair of left and right brackets 40 and 40, to side faces of the left and right rear side frames 13 and 13. A bracket 41 at a front end of the battery pack 31 is secured with bolts 42 and 42 to a lower surface of the front cross member 15. A bracket 43 at a rear end of the battery pack 31 is secured with bolts (not shown) to a lower surface of the rear cross member 17.

When the battery tray 32 is supported by the vehicle body frame, a rear end of the front subframe 21 and a protruding portion 32a protruding frontward from the front end of the battery pack 31 face each other in the front and rear direction, with a predetermined gap α (see FIG. 2) interposed therebetween.

The front subframe 21 forms the first rigid member of the present application, and the battery pack 31 forms the second rigid member of the present application. Oblique portions (each surrounded by a two-dot chain line in FIG. 2) at the front of the left and right floor frames 11 and 11 are shock absorbing members 11a and 11a (first and second shock absorbing members). The shock absorbing members 11a and 11a are not designed to be crushable zones which are particularly breakable, but they can be collapsed when excessive shock is input to the vehicle in the event of a front-end collision. In such a front-end collision of the vehicle, other parts of the vehicle body frame, other than the shock absorbing members 11a and 11a, can also be collapsed. Since the front subframe 21 and the battery pack 31 forming the first rigid member and the second rigid member, respectively, have high rigidity, the amount of their deformation in the event of the front-end collision is smaller than the amount of deformation of the shock absorbing members 11a and 11a.

Figure 5:
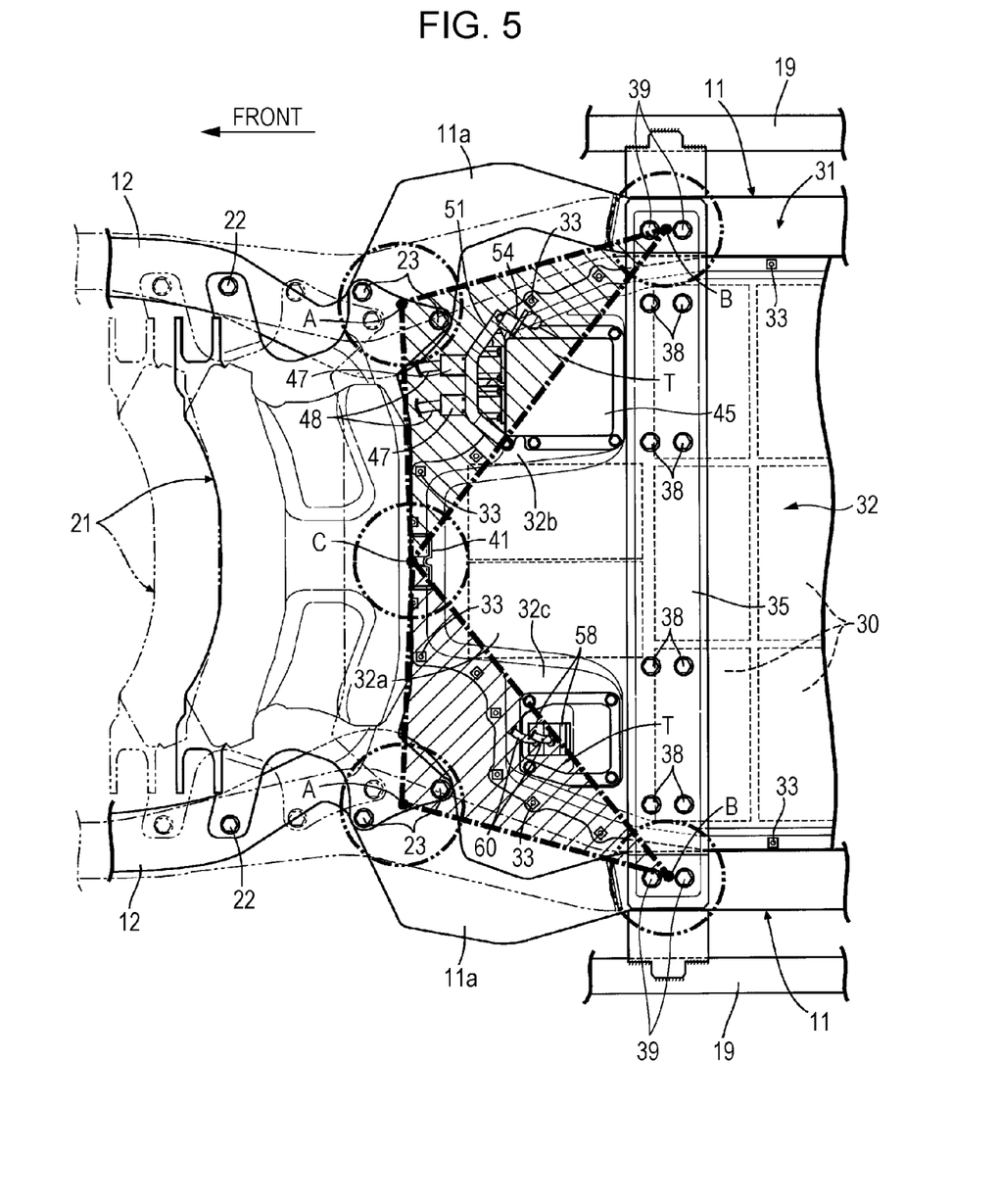
FIG. 5 is a plan view illustrating an action that takes place in the event of a front-end collision.

As illustrated in FIG. 5, areas where the shock absorbing members 11a and 11a of the floor frames 11 and 11 are connected at front ends thereof, with the bolts 23, to both left and right ends of the front subframe 21 are first connection portions A and A (first and second front connection portions).

Similarly, areas where the shock absorbing members 11a and 11a of the floor frames 11 and 11 are connected at rear ends thereof, with the bolts 39, to both left and right ends of the battery pack 31 (i.e., to both left and right ends of the suspended beam 35 on the foremost side) are second connection portions B and B (first and second rear connection portions).

Figure 1:
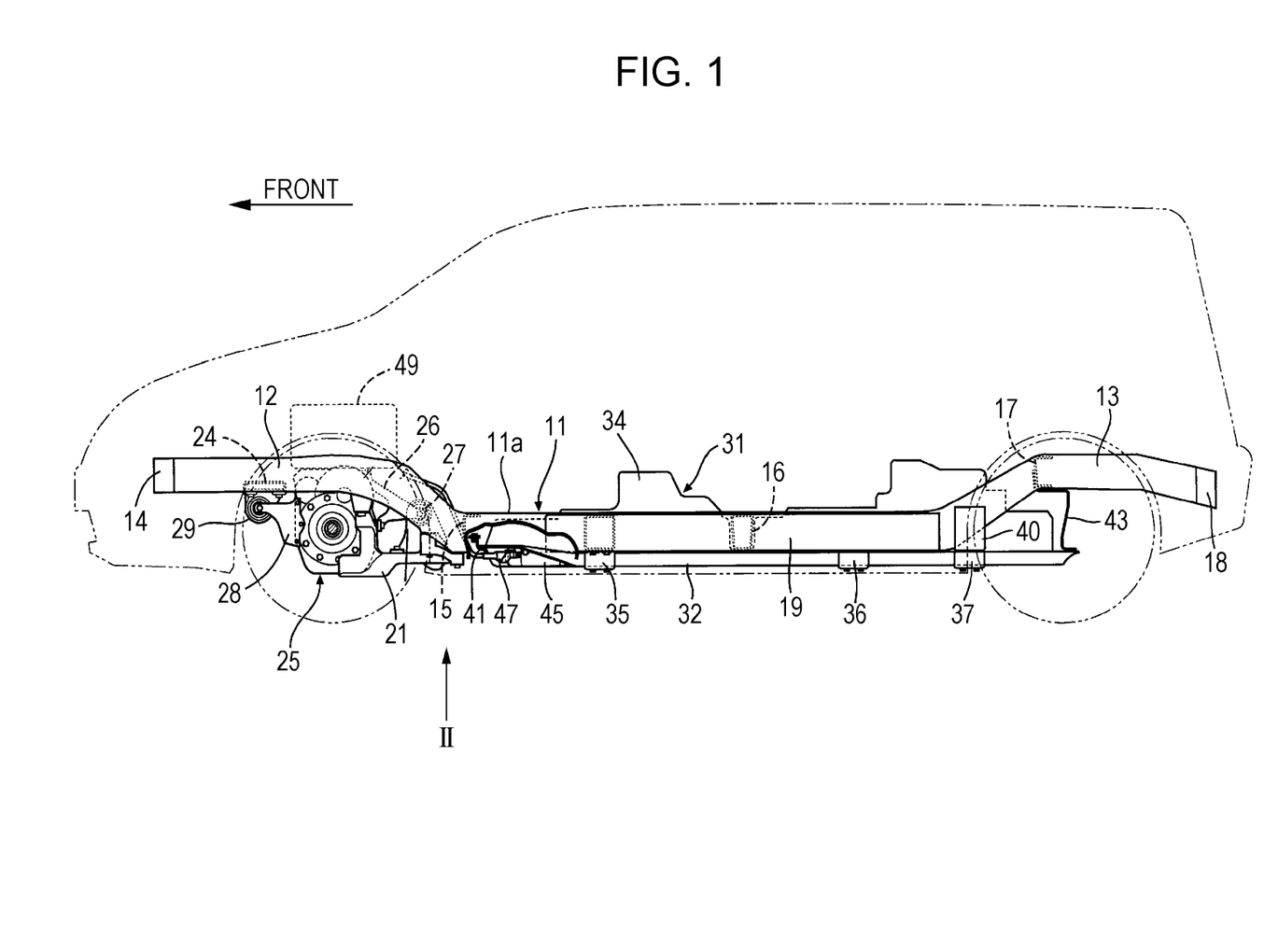
FIG. 1 is a side view of an electric vehicle.
Figure 2:
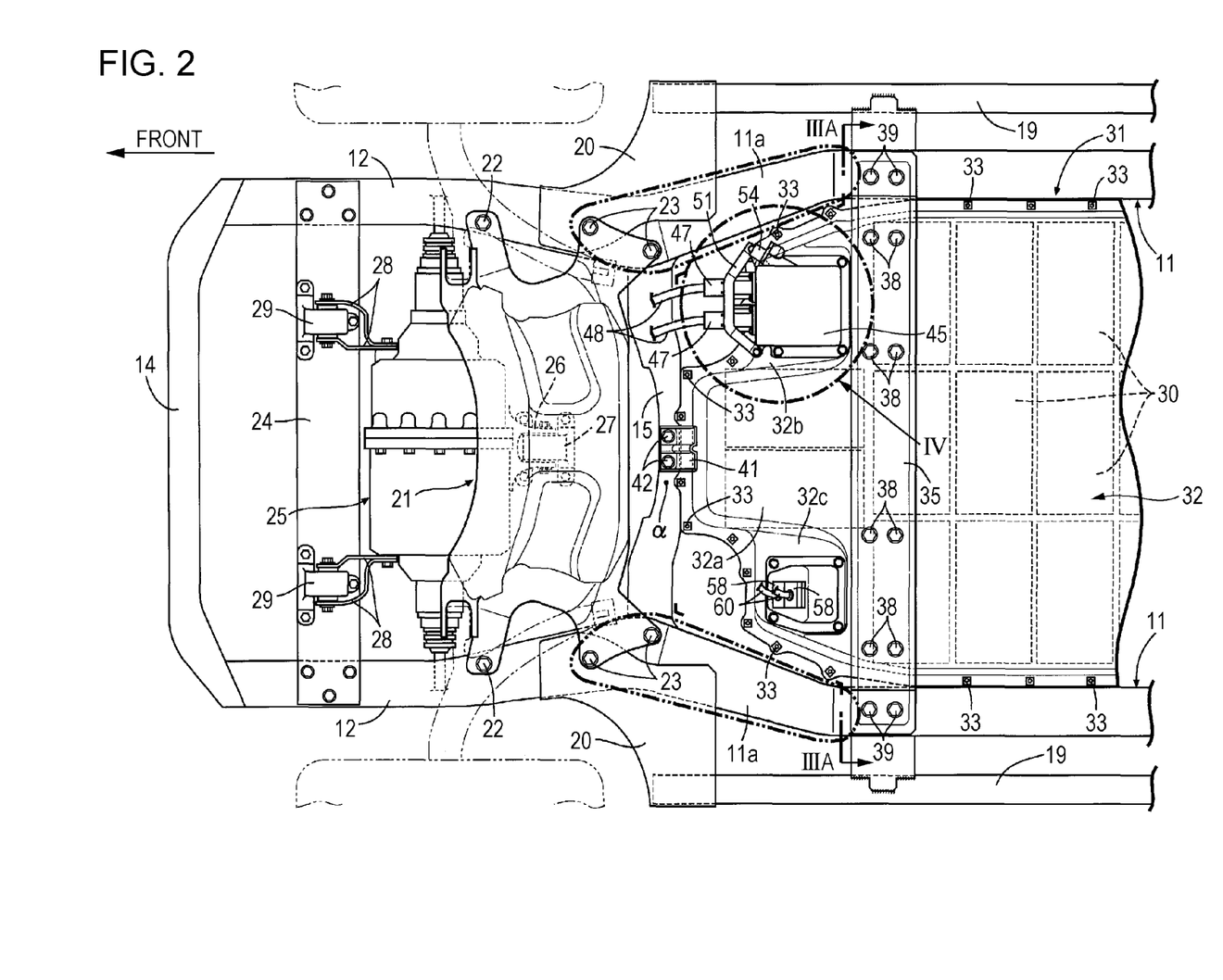
FIG. 2 is a plan view illustrating the electric vehicle as viewed in the direction of arrow II in FIG. 1.
Figure 3A:
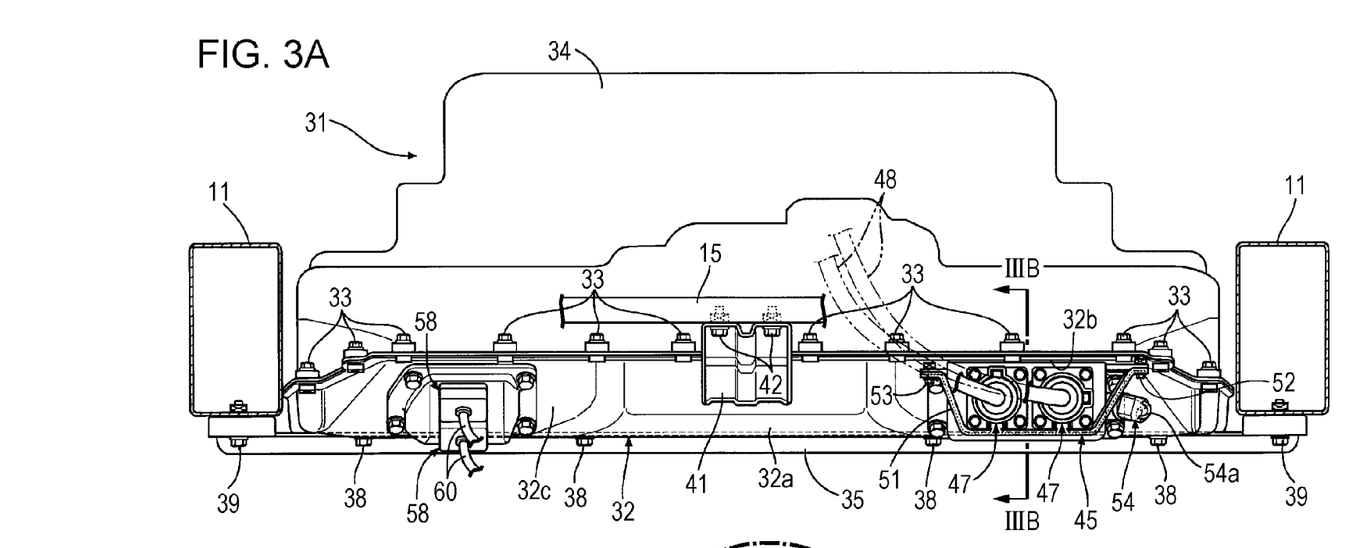
FIG. 3A is a cross-sectional view taken along line IIIA-IIIA of FIG. 2.
Figure 3B:
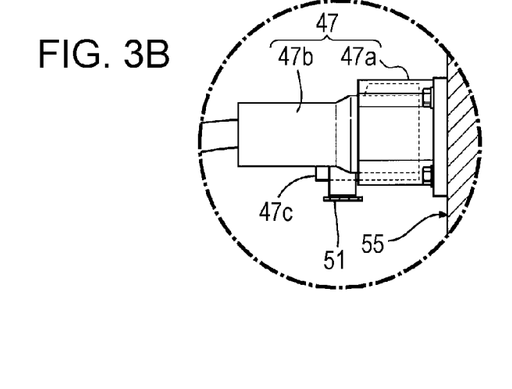
FIG. 3B is a cross-sectional view taken along line IIIB-IIIB of FIG. 3A.
Figure 4:
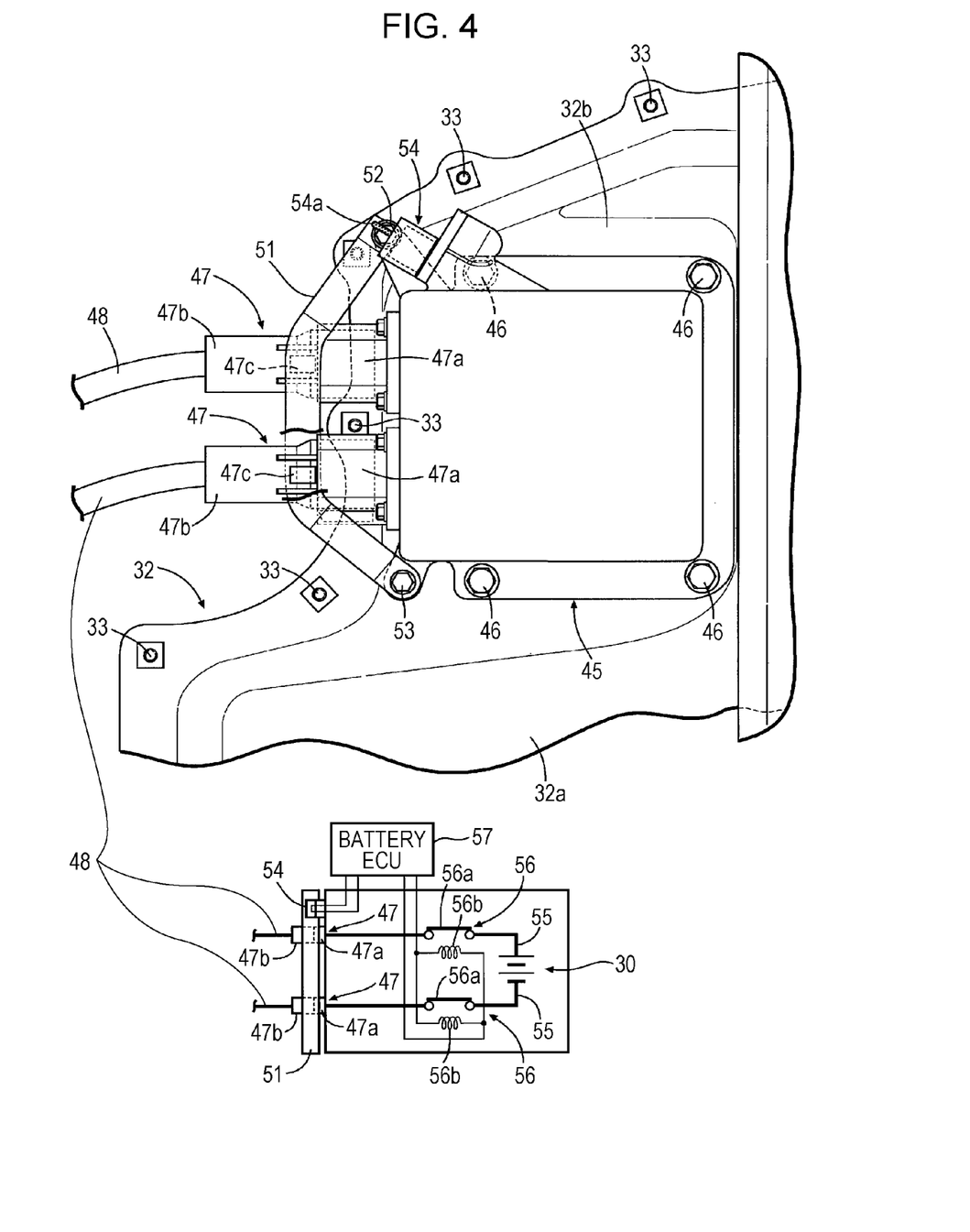
FIG. 4 is an enlarged view of area IV in FIG. 2.

As illustrated in FIG. 2 to FIG. 4, the battery tray 32 of the battery pack 31 has a recessed portion 32b at the rear and to the left of the protruding portion 32a. The recessed portion 32b is recessed upward. A high-voltage connector box 45 is secured with four bolts 46 to the recessed portion 32b. A pair of high-voltage connectors 47 and 47 (a first connector or a second connector) includes female connectors 47a and 47a (a first female connector or a second female connector) secured to the front of the high-voltage connector box 45, and male connectors 47b and 47b (a first male connector or a second male connector) that can be inserted into and removed from the female connectors 47a and 47a in the front and rear direction. Two high-voltage (e.g., 288 V) power lines 48 and 48 (a first power line or a second power line) extending from the respective female connectors 47a and 47a are connected to a power drive unit 49 (see FIG. 1) that controls the activation of the motor generator 25.

An interlock member 51 formed by a bent plate is secured, at both ends thereof, with two bolts 52 and 53 which are inserted upward from below and screwed into the lower surface of the battery tray 32. Lower surfaces of the female connectors 47a and 47a are provided with unlocking buttons 47c and 47c. Unless the unlocking buttons 47c and 47c are pressed, the male connectors 47b and 47b are locked so as not to be removed from the female connectors 47a and 47a. When the interlock member 51 is secured to the battery tray 32, the interlock member 51 is in the way and prevents the unlocking buttons 47c and 47c from being operated.

An interlock connector 54 having a handle 54a is placed on a side face of the high-voltage connector box 45 such that it can be inserted into and removed from the high-voltage connector box 45. The handle 54a of the interlock connector 54 inserted on the side face of the high-voltage connector box 45 is located on the axis of the bolt 52 with which one end of the interlock member 51 is secured.

Contacts 56a and 56a of two relays 56 and 56 are placed between terminals 55 and 55 on both ends of the plurality of series-connected battery modules 30 and the pair of high-voltage connectors 47 and 47. Coils 56b and 56b facing the respective contacts 56a and 56a are connected to a battery electronic control unit (ECU) 57, to which the interlock connector 54 is connected.

The battery tray 32 of the battery pack 31 has a recessed portion 32c at the rear and to the right of the protruding portion 32a. The recessed portion 32c is recessed upward. Female connectors of low-voltage connectors 58 and 58 (a first connector or a second connector) are secured with four bolts to the recessed portion 32c. Two low-voltage (e.g., 12 V) power lines 60 and 60 (a first power line or a second power line) extending from male connectors (a first male connector or a second male connector) that can be inserted into and removed from the female connectors (a first female connector or a second female connector) are connected to various vehicle-mounted devices.

The function of embodiments having the above-described configuration will now be described.

On the lower surface of the vehicle body frame, the rear end of the front subframe 21 on the front side and the front end of the battery pack 31 on the rear side face each other, with the gap α (see FIG. 2) interposed therebetween. If an excessive collision load is input, in the front and rear direction of the vehicle body, to the front side frames 12 and 12 by a front-end collision, the shock absorbing members 11a and 11a formed by front portions of the floor frames 11 and 11 connected to the rear ends of the front side frames 12 and 12 are buckled as illustrated in FIG. 5. Thus, the front subframe 21 is retracted and brings its rear end into contact with the front end of the battery pack 31.

If the front subframe 21 and the battery pack 31 can come into contact with each other at a contact point C, a pair of left and right triangular regions T and T (each indicated by a dash-dot chain line in FIG. 5) can be formed by the first connection portions A and A, the second connection portions B and B, and the contact point C. The triangular regions T and T (first and second triangular regions) are of high rigidity surrounded by the front subframe 21, the battery pack 31, and the shock absorbing members 11a and 11a buckled by the collision load. The high-voltage connectors 47 and 47 are disposed within one of the triangular regions T and T and the low-voltage connectors 58 and 58 are disposed within the other of the triangular regions T and T. This can provide protection to the high-voltage connectors 47 and 47 and the low-voltage connectors 58 and 58.

As described above, since the triangular regions T and T are defined on the basis of the positions of the first connection portions A and A, the second connection portions B and B, and the contact point C after the shock absorbing members 11a and 11a are deformed by the collision load, it is possible to more reliably prevent the high-voltage connectors 47 and 47 and the low-voltage connectors 58 and 58 from being damaged by collision. In particular, if the high-voltage connectors 47 and 47 are damaged and a ground fault occurs in the vehicle body frame, there is a danger of electric shock. With the configuration of the present embodiment, it is possible to reliably prevent occurrence of the ground fault.

Figure 6A:
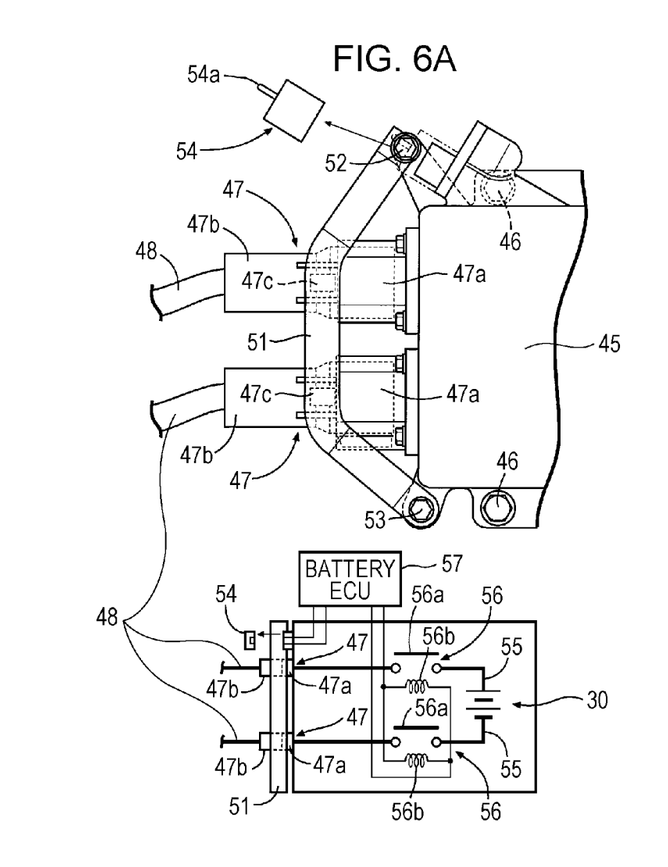
FIG. 6A and FIG. 6B illustrate actions that take place in separation of high-voltage connectors.

For example, when the male connectors 47b and 47b are pulled out of the female connectors 47a and 47a of the high-voltage connectors 47 and 47 for replacement of the battery pack 31, there is a danger of electric shock if a voltage as high as 288 V is applied to the high-voltage connectors 47 and 47. To prevent electric shock, it is necessary to interrupt in advance the application of a high voltage to the high-voltage connectors 47 and 47. When the interlock connector 54 is pulled out as illustrated in FIG. 6A, the battery ECU 57 detects it and stops the flow of current to the coils 56b and 56b of the relays 56 and 56. Thus, the contacts 56a and 56a open and interrupt the application of a high voltage to the high-voltage connectors 47 and 47.

Figure 6B:
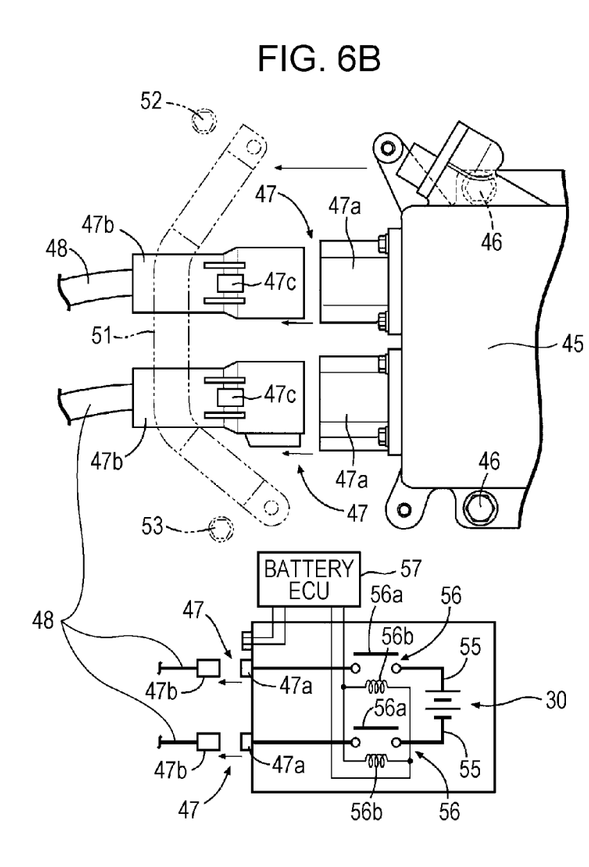

To pull out the male connectors 47b and 47b from the female connectors 47a and 47a of the high-voltage connectors 47 and 47, it is necessary to press the unlocking buttons 47c and 47c on the male connectors 47b and 47b. However, when the interlock member 51 is mounted, the unlocking buttons 47c and 47c are hidden and thus cannot be pressed. To press the unlocking buttons 47c and 47c, it is necessary to loosen the two bolts 52 and 53 with a tool and remove the interlock member 51. Since the interlock connector 54 has already been pulled out, the bolt 52 can be loosened with the tool without causing interference with the interlock connector 54. Thus, as illustrated in FIG. 6B, it is possible to remove the interlock member 51, press the unlocking buttons 47c and 47c, and pull out the male connectors 47b and 47b from the female connectors 47a and 47a.

Even if the operator attempts to remove the interlock member 51 without pulling out the interlock connector 54, the bolt 52 cannot be loosened due to interference of the tool with the interlock connector 54 as illustrated in FIG. 4. Thus, since the unlocking buttons 47c and 47c cannot be pressed and the male connectors 47b and 47b cannot be pulled out of the female connectors 47a and 47a, it is possible to prevent the occurrence of electric shock accidents.

Although embodiments of the present application have been described, various design changes can be made without departing from the scope of the present application.

For example, the present application is applicable not only to electric vehicles having only a motor generator as a running drive source, but also to hybrid vehicles having both an engine and a motor generator as a running drive source.

Also, the first rigid member and the second rigid member of the present application are not limited to the front subframe 21 and the battery pack 31 of the embodiments.

Although the shock absorbing members 11a and 11a are formed by part of the floor frames 11 and 11 in the embodiments, the present application is not limited to this.

According to a first aspect of the embodiment, a power supply system for an electric vehicle is proposed which includes a battery mounted on a vehicle body, at least one power line configured to supply power from the battery, at least one connector configured to connect the power line to the battery, at least one shock absorbing member configured to form part of a vehicle body frame and deform in the event of a front-end collision of the vehicle to absorb collision energy, a first rigid member disposed to the front of the shock absorbing member and connected to the shock absorbing member at a first connection portion, and a second rigid member disposed to the rear of the shock absorbing member and connected to the shock absorbing member at a second connection portion. A rear portion of the first rigid member retracted in the event of a front-end collision of the vehicle can come into contact with a front portion of the second rigid member at a contact point. The connector is disposed within a triangular region formed by the first connection portion, the second connection portion, and the contact point.

In the configuration of the first aspect, when a front-end collision of the vehicle causes the shock absorbing member forming part of the vehicle body frame to buckle and causes the first rigid member to retract, the rear portion of the first rigid member comes into contact with the front portion of the second rigid member at the contact point. As a result, the triangular region of high rigidity is formed by the first connection portion that connects the shock absorbing member to the first rigid member, the second connection portion that connects the shock absorbing member to the second rigid member, and the contact point. The connector that connects the battery mounted on the vehicle body to the power line is disposed within the triangular region. It is thus possible to prevent a front-end collision of the vehicle from damaging the connector and causing a ground fault of the battery. In particular, since the triangular region is defined to allow for buckling of the shock absorbing member, the connector can be more reliably protected.

According to a second aspect of the embodiment, in the configuration of the first aspect, there are two triangular regions spaced in a vehicle width direction, and the connector on a high-voltage side is disposed within one of the triangular regions and the connector on a low-voltage side is disposed within the other of the triangular regions.

In the configuration of the second aspect, it is possible to reliably protect the two connectors, one on the high-voltage side and the other on the low-voltage side.

Obviously, numerous modifications and variations of the present invention are possible in light of the above teachings. It is therefore to be understood that within the scope of the appended claims, the invention may be practiced otherwise than as specifically described herein.

What is claimed is:

1. A power supply system for an electric vehicle, comprising:
- a battery mounted on a vehicle body of the electric vehicle;
- a first power line via which power is to be supplied from the battery;
- a first connector connecting the first power line to the battery;
- a first shock absorbing member provided in a vehicle body frame of the vehicle body and including a structure to deform to absorb collision energy when a front-end collision of the electric vehicle occurs;
- a first rigid member disposed on a front side of the first shock absorbing member and including a first front connection portion and a rear portion, the first front connection portion being connected to the first shock absorbing member; and
- a second rigid member disposed on a rear side of the first shock absorbing member and including a first rear connection portion and a front portion, the first rear connection portion being connected to the first shock absorbing member, the rear portion of the first rigid member being spaced apart from the front portion of the second rigid member in a front and rear direction of the electric vehicle, the rear portion of the first rigid member being contactable with the front portion of the second rigid member at a contact point when a front-end collision of the electric vehicle occurs, the first connector being disposed within a first triangular region defined by the first front connection portion, the first rear connection portion, and the contact point in a plan view of the electric vehicle.

2. The power supply system according to claim 1, further comprising:
- a second power line via which power is to be supplied from the battery;
- a second connector connecting the second power line to the battery; and
- a second shock absorbing member provided in the vehicle body frame and including a structure to deform to absorb collision energy when a front-end collision of the electric vehicle occurs, the second shock absorbing member being spaced apart from the first shock absorbing member in a vehicle width direction of the electric vehicle,
- wherein the first rigid member includes a second front connection portion connected to the second shock absorbing member,
- wherein the second rigid member includes a second rear connection portion connected to the second shock absorbing member, and
- wherein the second connector is disposed within a second triangular region defined by the second front connection portion, the second rear connection portion, and the contact point in the plan view of the electric vehicle.

3. The power supply system according to claim 2,
wherein the first connector is provided on a high-voltage side, and
wherein the second connector is provided on a low-voltage side.

4. The power supply system according to claim 2,
wherein the first and second connectors are provided between the first and second shock absorbing members in the vehicle width direction in the plan view of the electric vehicle.

5. The power supply system according to claim 2,
wherein the rear portion of the first rigid member is provided between the first and second front connection portions in the vehicle width direction, and
wherein the front portion of the second rigid member is provided between the first and second rear connection portions in the vehicle width direction.

6. The power supply system according to claim 2,
wherein the first connector includes a first female connector and a first male connector connected to the first female connector, and
wherein the second connector includes a second female connector and a second male connector connected to the second female connector.

7. The power supply system according to claim 2,
wherein a distance between the rear portion of the first rigid member and the front portion of the second rigid member in the front and rear direction is shorter than a distance between the first rigid member and the first connector in the front and rear direction in the plan view of the electric vehicle, and
wherein the distance between the rear portion of the first rigid member and the front portion of the second rigid member in the front and rear direction is shorter than a distance between the first rigid member and the second connector in the front and rear direction in the plan view of the electric vehicle.

8. The power supply system according to claim 1,
wherein the first connector includes a first female connector and a first male connector connected to the first female connector.

9. The power supply system according to claim 1,
wherein a distance between the rear portion of the first rigid member and the front portion of the second rigid member in the front and rear direction is shorter than a distance between the first rigid member and the first connector in the front and rear direction in the plan view of the electric vehicle.

10. The power supply system according to claim 1,
wherein the battery is provided inside the second rigid member.

* * * * *